March 7, 1961   F. B. HARWOOD   2,973,989
ARTICLE CARRYING DEVICE
Filed March 17, 1958   2 Sheets-Sheet 1

INVENTOR.
FRED B. HARWOOD
BY *M. A. Hobbs*
ATTORNEY

March 7, 1961  F. B. HARWOOD  2,973,989
ARTICLE CARRYING DEVICE
Filed March 17, 1958  2 Sheets-Sheet 2
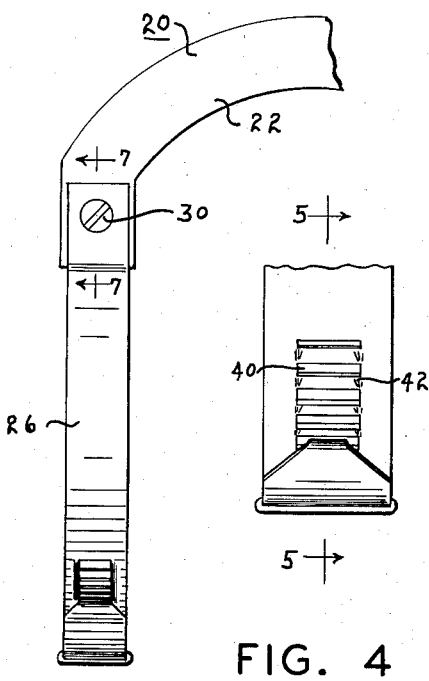
FIG. 3
FIG. 4
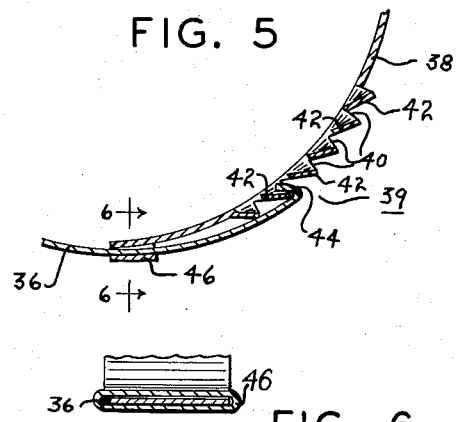
FIG. 5
FIG. 6
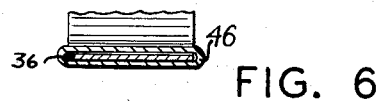
FIG. 7
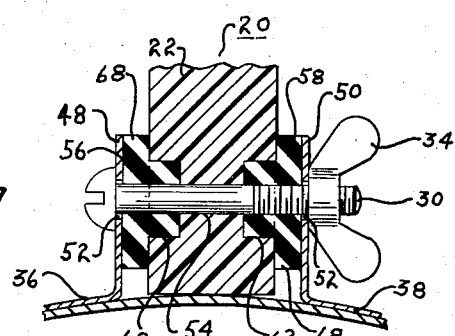
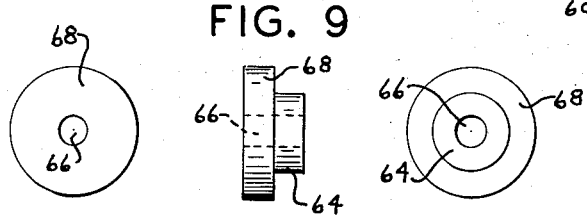
FIG. 8  FIG. 9  FIG. 10
INVENTOR.
FRED B. HARWOOD
BY m. a. Hobbs
ATTORNEY

United States Patent Office 2,973,989
Patented Mar. 7, 1961

2,973,989

ARTICLE CARRYING DEVICE

Fred B. Harwood, 54728 Terrace Lane, South Bend, Ind.

Filed Mar. 17, 1958, Ser. No. 721,820

7 Claims. (Cl. 294—31.2)

The present invention relates to an article carrying means and more particularly to a device for facilitating carrying and handling cylindrical and tubular articles and the like.

One of the principal objects of the present invention is to provide a device for carrying and handling articles such as vacuum bottles, lunch containers and the like, which can readily be adjusted to and assembled on various sized articles of this type and which remains securely and firmly thereon until it is intentionally removed.

Another object of the invention is to provide a device having a handle for carrying cylindrical and tubular objects, which can be varied over a relatively wide range to an infinite number of sized objects, and thereafter tightened firmly in place thereon.

Still another object is to provide a handle for vacuum bottles and the like, including a compact and adjustable fixture of simple construction for holding the handle firmly in place for long continued and convenient use.

A further object of the invention is to provide a fixture for a handle used to carry cylindrical and tubular articles which fits snugly around the article and holds the handle rigidly in an upright or radial position in respect to the surface of the article.

Another object of the invention is to provide a handle and fixture for carrying vacuum bottles, lunch containers and the like, which can be securely attached in place on the article and easily removed and replaced when the article is cleaned between uses.

Additional objects and advantages will become apparent from the following description and accompanying drawings, wherein:

Figure 3 is an enlarged fragmentary view of the handle and fixture for attaching the handle to cylindrical and tubular articles;

Figure 4 is an enlarged fragmentary view of a portion of the handle attaching fixture showing a part of the construction of the size adjustment feature of the fixture;

Figure 5 is a cross sectional view of the fixture portion shown in Figure 4 taken on line 5—5;

Figure 6 is a cross sectional view of the handle attaching fixture taken on line 6—6 of Figure 5;

Figure 7 is an enlarged fragmentary cross sectional view of a portion of the handle and the fixture taken on line 7—7 of Figure 3, showing another part of the construction of the size adjustment feature of the device;

Figure 8 is an elevational view of one end of a part of the size adjustment means shown in Figure 7;

Figure 9 is a side elevational view of the part shown in Figure 8; and

Figure 10 is an elevational view of the other end of the part shown in Figures 8 and 9.

Figure 1:
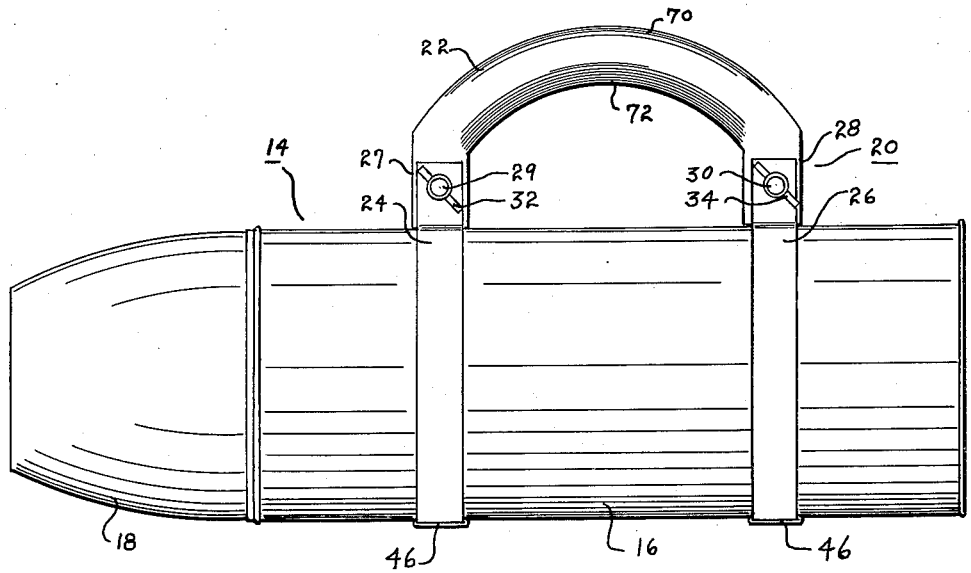
Figure 1 is a side elevational view of a conventional vacuum bottle showing my article carrying device assembled thereon.
Figure 2:
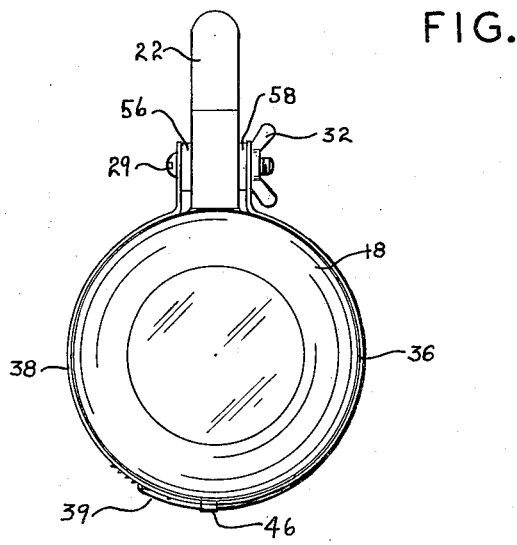
Figure 2 is an end view of the vacuum bottle and my article carrying device shown in Figure 1.

Referring more specifically to the drawings, numeral 14 indicates a conventional vacuum bottle having a cylindrical container portion 16 and a cap or cup portion 18, and numeral 20 indicates generally my article carrying device mounted in place on container portion 16 of the vacuum bottle. A vacuum bottle is shown and described herein merely for the purpose of illustrating one use of the present device which can be readily adapted to other types of articles such as lunch containers, cans tubes and similar generally cylindrically shaped articles.

My article carrying device shown in the drawings consists of an arcuate-shaped handle 22 secured to the vacuum bottle by fixtures 24 and 26 connected to the legs 27 and 28 of the handle by bolts 29 and 30, respectively, winged nuts 32 and 34 preferably being used on the bolts to permit easy assembling and disassembling of the device on an article. The band-like portion of each fixture is formed of two metal sections 36 and 38 joined together by an adjustable fastening means 39 consisting of a series of slots 40 between louver-like members 42 in section 38 and a hook or tongue 44 on the end of the section 36 for extending into one of slots 40 and hooking over the adjacent cross member 42. The louver-like members, which are stamped or otherwise formed from the metal comprising section 38 and are substantially shorter than the width of the band so that the slots will not materially reduce the strength of the section, extend outwardly and away from section 36 to provide a strong, easily engaged member for hook 44. The two sections 36 and 38 are preferably the same width and are retained in alignment with each other after they are assembled on an article by a band 46 secured to the end of section 38 and extending around section 36 as seen in Figure 6.

The upper ends of sections 36 and 38 are turned upwardly or outwardly along the sides of the handle at the ends thereof to form flanges 48 and 50, respectively. Bolts 29 and 30 extend through holes 52 in the flanges and through a hole 54 in the handle and have mounted thereon rubber lugs 56 and 58 which seat at their inner ends in recesses 60 and 62, respectively. Each lug is provided with a cylindrical body portion 64 which extends into the recess in the handle and which contains central hole 66 and with a relatively large and thick annular flange 68 which extends outwardly from the bolt between the handle and the inner surface of flange 48 or 50. When the winged nuts are tightened the rubber lugs yield, permitting flanges 48 and 50 to be drawn toward the handle, thus pulling the fixture tightly around the container of the vacuum bottle and clamping the handle firmly and rigidly in its upright or radial position as seen in the drawings. As the nuts are tightened, hook becomes firmly seated in one of slots 40 and is held securely on one of cross members 42 where it remains until the nuts are again loosened to remove the carrying device.

One of the important features of the present invention is the use of the thick, heavy rubber lugs 56 and 58 between flanges 48 and 50 and the sides of the handle, including cylindrical portion 64 which extends into recesses 60 or 62. These rubber lugs yield sufficiently to permit the bands to be drawn tightly around the container 16 and, as they yield under the pressure exerted by the tightening of nuts 32 and 34 on bolts 29 and 30, respectively, they grip the handle and hold it firmly in the upright position as shown in the drawings. Cylindrical portion 64 gives greater flexibility to the lug for maximum gripping action against the sides and ends of the recess and sides of the handle. In addition the cylindrical portion when seated in the recess holds the lug in place on the handle, when the carrying device is removed from the vacuum bottle, thus facilitating the reassembling of the device onto the bottle.

The handle 20 is illustrated as being constructed of plastic; however, any other suitable material may be used, if desired, such as wood, metal or hard rubber. The edges of the handle which come in contact with the fingers or other part of the carrier's hand are preferably rounded as shown at numerals 70 and 72.

When the carrying device is to be assembled on an article, such as a vacuum bottle, nuts 32 and 34 are either removed from the bolts or extensively loosened so that sections 36 and 38 of fixtures 24 and 26 can be placed around the bottle and hook 44 inserted in the slot 40 selected which permits the upper ends of sections 36 and 38 to engage the rubber lugs. The nuts are then tightened, drawing the hook firmly against the adjacent cross member 42 and compressing the rubber lugs 56 and 58 between flanges 48 and 50 and the sides of handle 20. When the nuts have been adequately tightened, fixtures 24 and 26 firmly grip the container sides with sufficient force to prevent them from slipping on the container, and the handle is held rigidly in the upright position by the bolts and rubber lugs, the latter pressing against the walls of recesses 60 and 62 and the sides of the lower portion of the handle. If it is desired to remove the handle temporarily for the purpose of thoroughly cleaning the vacuum bottle, the nuts are merely loosened to the extent necessary to permit hook 44 to be disengaged from the cross member 42, and the bottle slipped from between sections 36 and 38 of fixtures 24 and 26. After the bottle has been cleaned, the fixtures are replaced around the bottle, the hook snapped into the proper slot 40, and the nuts retightened.

Various changes and modifications can be made in the article carrying device described without departing from the scope of the present invention. For example, flanges 48 and 50 may be made of heavier material than the remainder of sections 36 and 38 and then riveted, welded or soldered onto the ends of the sections. Band 46 may be made as an integral part of section 38 or formed as a separate part and attached thereto. While the louver shape is the preferred construction of the cross members other shapes such as a straight bar shape, or a pin in one section and a series of longitudinally spaced holes in the other section, can be used if desired.

I claim:

1. A device for carrying vacuum bottles and the like having a cylindrical portion, comprising an arcuate-shaped rigid handle having a pair of spaced legs thereon with a hole extending transversely through each leg, each hole being enlarged at each end, a rubber lug for each enlarged end portion, said lug having a cylindrical portion seating in the enlarged portion and an annular flange extending radially from the hole, a fixture at each end of said handle, each fixture including a section of strip metal having a flange at one end for engaging one of said lugs and a series of spaced slots with louver-like cross members therebetween near the other end, a section of strip metal having a flange at one end for engaging the lug opposite the last mentioned lug and a hook on the other end for engaging one of said cross members, a band attached to said first mentioned section between said cross members and the nearest end of said first mentioned section and extending around said other section, a bolt extending through the oppositely disposed flanges and lugs and the hole in the respective leg of the handle, and a winged nut on each bolt for clamping the flanges, lugs and handle together and simultaneously tightening said fixtures around the cylindrical portion of the bottle.

2. A device for carrying vacuum bottles and the like, comprising an arcuate-shaped rigid handle with a hole extending transversely therethrough near each end, each hole being enlarged at each end, a rubber lug for each enlarged end portion, said lug having a cylindrical portion seating in the enlarged portion and an annular flange extending radially from the hole, a fixture at each end of said handle, each fixture including a section of strip metal having a flange at one end for engaging one of said lugs and a series of spaced cross members near the other end, a section of strip metal having a flange at one end for engaging the lug opposite the last mentioned lug and a hook on the other end for engaging one of said cross members, a bolt extending through the oppositely disposed flanges and lugs and the respective hole in the handle, and a nut on each bolt.

3. A device for carrying cylindrical and tubular shaped articles, comprising an arcuate shaped rigid handle, a pair of opposed recesses in said handle at each end thereof, each pair of recesses being connected by a hole, a rubber lug for each recess, said lug having a cylindrical portion seating in the recess and a flange extending radially from the recess, a fixture at each end of said handle, each fixture including a section of strip metal having a flange at one end for engaging one of said lugs and a series of spaced cross members near the other end, a section of strip metal having a flange at one end for engaging the lug opposite the last mentioned lug and a hook on the other end for engaging one of said cross members, and a means extending through the oppositely disposed flanges and lugs and the respective hole in the handle for clamping the flanges, lugs and handle together.

4. A device for carrying cylindrical and tubular shaped articles, comprising a rigid handle, a pair of opposed recesses in said handle at each end thereof, each pair of recesses being connected by a hole, a rubber lug for each recess, said lug having a cylindrical portion seating in the recess and a flange extending radially from the recess, a fixture at each end of said handle, each fixture including a section of strip metal having a flange at one end for engaging one of said lugs, a second section of strip metal having a flange at one end for engaging the lug opposite the last mentioned lug, an adjustable means for connecting the ends of said sections opposite said flanges, and means extending through the holes in said handle for clamping the respective flanges, lugs and handle end together.

5. A device for carrying vacuum bottles and the like having a cylindrical portion, comprising an arcuate-shaped rigid handle having a pair of spaced legs thereon with a hole extending transversely through each leg and being enlarged at one end, a rubber lug for each enlarged end portion having an annular flange extending radially from the hole, a fixture at each end of said handle, each fixture including a section of strip metal having a flange at one end for engaging one of said lugs, a second section of strip metal having a flange at one end for engaging the lug opposite the last mentioned lug, an adjustable means for connecting the ends of said sections opposite said flanges, and means extending through the holes in said handle for clamping the respective flanges, lug and handle end together.

6. An article carrying device, comprising a rigid handle with a hole in each end, a rubber lug at each end of each of said holes, a fixture at each end of said handle, each fixture including a section of strip metal having a flange at one end for engaging one of said lugs and a series of spaced slots with louver-like cross members therebetween near the other end, a section of strip metal having a flange at one end for engaging the lug opposite the last mentioned lug, a hook on the other end for engaging one of said cross members, a bolt extending through the oppositely disposed flanges and lugs and the hole in the respective ends of the handle, and a nut on each bolt for clamping the flanges, lugs and handle together and simultaneously tightening said fixtures around the article.

7. An article carrying device, comprising a rigid handle with a hole in each end, a resilient lug at each end of each of said holes, a fixture at each end of said handle, each fixture including a section of strip metal having a flange at one end for engaging one of said lugs and a series of spaced cross members near the other end, a section of strip metal having a flange at one end for engaging the lug opposite the last mentioned lug and a hook on the other end for engaging one of said cross members, and a means extending through the oppositely disposed flanges and lugs and the respective hole in the handle for clamping the flanges, lugs and handle together.

References Cited in the file of this patent

UNITED STATES PATENTS

| | | |
|---|---|---|
| 944,752 | Vogel | Dec. 28, 1909 |
| 946,990 | Swope | Jan. 18, 1910 |
| 2,434,122 | Reichold | Jan. 6, 1948 |
| 2,655,300 | Willms | Oct. 13, 1953 |
| 2,744,668 | Henigman | May 8, 1956 |
| 2,760,808 | Moyer et al. | Aug. 28, 1956 |
| 2,771,262 | Laystrom | Nov. 20, 1956 |